United States Patent [19]

Kraus

[11] 4,041,587
[45] Aug. 16, 1977

[54] METHOD OF PRODUCING LAYER CAPACITORS

[75] Inventor: Hubert Kraus, Regensburg, Germany

[73] Assignee: Siemens Aktiengesellschaft, Berlin & Munich, Germany

[21] Appl. No.: 689,255

[22] Filed: May 24, 1976

[30] Foreign Application Priority Data

June 11, 1975 Germany .............................. 2526130

[51] Int. Cl.² ................................................ H01G 4/22
[52] U.S. Cl. ................................. 29/25.42; 29/527.2; 83/22; 83/169; 427/79; 361/313
[58] Field of Search ............................. 29/25.42, 527.2; 317/258, 261; 427/79, 289; 83/22, 169

[56] References Cited

U.S. PATENT DOCUMENTS

| | | | |
|---|---|---|---|
| 1,779,876 | 10/1930 | Gay | 83/169 |
| 2,673,792 | 3/1954 | Gulton | 29/25.42 |
| 2,731,706 | 1/1956 | Grouse | 29/25.42 |
| 2,947,065 | 8/1960 | Moody et al. | 83/22 X |
| 3,614,561 | 10/1971 | Behn et al. | 29/25.42 X |

*Primary Examiner*—Carl E. Hall
*Attorney, Agent, or Firm*—Hill, Gross, Simpson, Van Santen, Steadman, Chiara & Simpson

[57] ABSTRACT

In the production of electric stack or layer capacitors, which capacitors are produced, in part, by sawing through a mother capacitor, a polyolefin layer is placed on the mother capacitor prior to cutting in order to provide lubrication during cutting and in order to improve the insulation at the cutting edges. The invention is advantageously employed in the production of layer capacitors having polyethylene terephthalate layers as the dielectric.

5 Claims, 2 Drawing Figures

1 mother or parent
2 metallic coated dielectric
4 polyolefin
5 saw blade
6 Schoop sprayed layer 1 mother or parent
2 metallic coated dielectric
4 polyolefin
5 saw blade
6 Schoop sprayed layer

METHOD OF PRODUCING LAYER CAPACITORS

BACKGROUND OF THE INVENTION

1. Field of the Invention

The present invention relates to a method for the production of electric stack or layer capacitors having synthetic layers as the dielectrics, and aluminum coatings applied to the synthetic layers, whereby the individual capacitors are separated from a mother capacitor by means of sawing, and whereby, as a consequence of the heat formation during the sawing operation, the capacitor layers of the mother capacitor, which are stretched and being capable of contracted, are contracted in the area of the cutting edge and the coatings in this region are broken into insulating islands, and wherein the saw blade is coated with an insulating lubricant during the sawing operation.

2. Description of the Prior Art

Stack or layer capacitors as generally described above are known in the art, as is the technique of sawing a mother capacitor to produce individual capacitors.

The provision of a lubrication during sawing has already been proposed in an application for U.S. Letters Pat. Ser. No. 639,120. In this application, the coating of the saw blade with wax is not suitable for all types of capacitors produced by this method.

SUMMARY OF THE INVENTION

The object of the present invention resides in the provision of a sawing method in which the dielectric layers, which also have a tendency to lubricate, are sawed such that satisfactory insulating cutting edges result, and an intolerable burr formation is avoided.

According to the present invention, the above object is achieved in that a polyolefin layer is arranged on the mother capacitor which is to be separated. The polyolefin layer is sawed together with the mother capacitor and the saw blade, in the region of its contact with the mother capacitor, first penetrates the polyolefin layer, and only after such penetration is the capacitively operative region of the capacitor penetrated by the saw blade.

The polyolefin layer is melted due to the sawing operation and at the same time the polyolefin material is drawn through the saw kerf, whereby, utilizing its heat of fusion, the polyolefin material simultaneously acts as a cooling agent as well as a lubricant. After the sawing process, the polyolefin material, solidified again, represents an additional insulation in the region of the cutting surfaces. A layer containing polyethylene or polypropylene is particularly suited as a meltable polyolefin layer. A layer thickness of 200 μm is sufficient for the conventional capacitor dimensions of layer capacitors. The thickness of the other capacitors which are to be separated is conventionally up to 10 mm.

With the aid of the method of the present invention, very high insulation values may be obtained in the region of the cut edges. This method makes possible the utilization of lacquers which are capable of being heat-sealed, for example polyester lacquer, for the purpose of cementing cover layers consisting of, for example, polyethylene terephthalate this being advantageous because of the good adhesive properties of a polyester lacquer. With other lubricants, such as waxes, for example, a sufficient dielectric strength cannot be achieved during sawing of other capacitors of this type. The polyethylene may also be used as an adhesive in order to cement the cover layers, and thus likewise effect an improvement in the edge insulation during sawing. However, this method has only a limited use, since the adhesive properties of the polyethylene on polyethylene terephthalate are not sufficient in many instances.

An advantageous embodiment of the method of the present invention resides in the application of a polyethylene layer onto a mother capacitor having dielectric layers consisting of polyethylene terephthalate, prior to the sawing operation. Using a fine-toothed circular metal saw blade having a thickness of 0.5 mm, a diameter of 100 mm and 160 teeth as specified by DIN 1837, and having a rate of revolution of at least 1500 RPM and a speed of advancement which does not exceed 50 mm/sec, the saw blade is freed of the burr.

In practicing a method such as described above, values for the dielectric strength in the region of the cut surfaces of 650–700 VDC may be obtained for capacitors having a 5 μm thick polyethylene terephthalate dielectric. For capacitors having an 8 μm thick polyethylene terephthalate dielectric, a dielectric strength in the region of the cut surfaces of 950–1000 VDC can be obtained.

For capacitors having a sawing area of more than 0.5 cm$^2$, it is advantageous to additionally blow air on the saw blade in order to effect cooling, and thus centrifuge off the synthetic material from the saw teeth, which material is becoming solidified.

BRIEF DESCRIPTION OF THE DRAWINGS

Other objects, features and advantages of the invention, its organization, construction and operation will be best understood from the following detailed description taken in conjunction with the accompanying drawings, on which.

DESCRIPTION OF THE PREFERRED EMBODIMENTS

Figure 1:
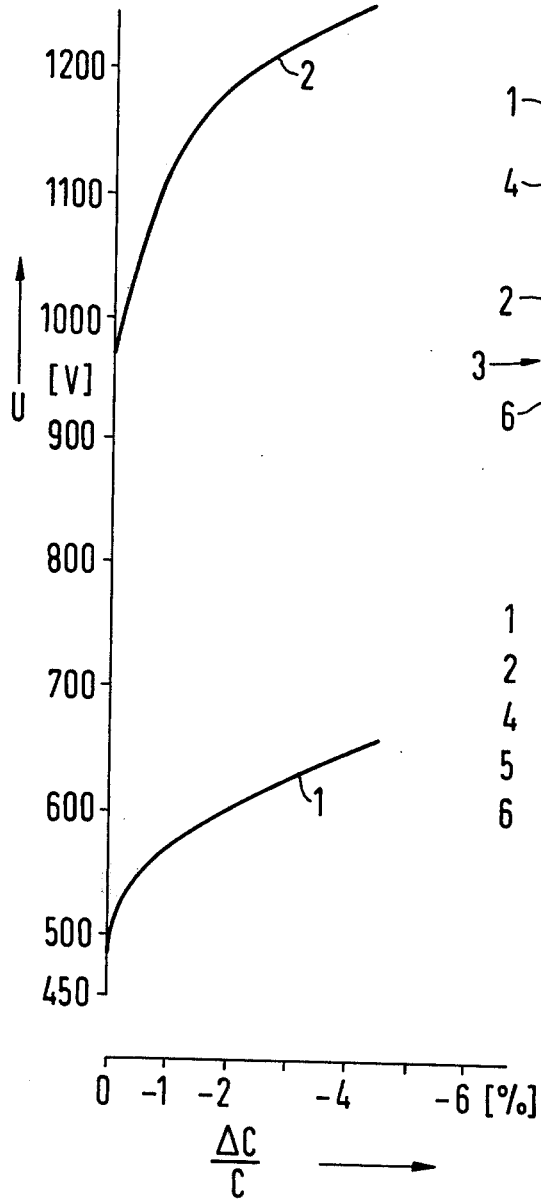
FIG. 1 is a graphic illustration of the dielectric strength of an illustrative capacitor produced in accordance with the present invention as compared to a capacitor produced by conventional techniques.

Referring first to FIG. 1, the capacitance acceptance from the applied voltage of regenerating disruptive breakdowns or edge electrical discharges is illustrated for capacitors of the type described having an 8 μm thick polyethylene terephthalate dielectric. More specifically the curve referenced 11 illustrates the values for capacitors which were sawed without the supplement of a polyethylene layer, whereas the curve referenced 12 illustrates the values for capacitors which were sawed after having the supplemental polyolefin layer, in particular a polyethylene layer, applied to the mother capacitor. It is readily apparent from the graphic illustration that the dielectric strength is approximately doubled by sawing in conjunction with the supplement of a polyethylene layer.

Figure 2:
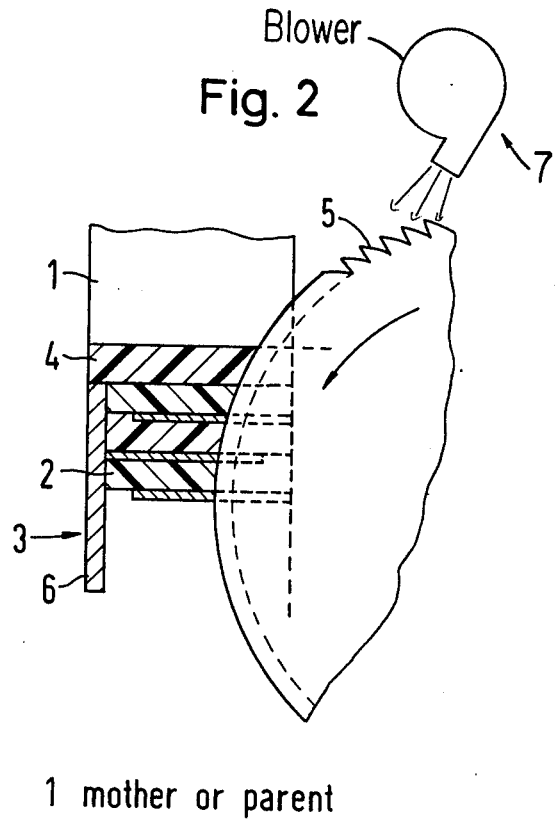
FIG. 2 is a schematic illustration of a device for carrying out the method of the present invention.

FIG. 2 schematically illustrates a device for carrying out the method of the present invention. In FIG. 2, individual capacitors are separated from a mother capacitor 1, which was formed by winding metallized synthetic layers 2 on a wheel (not shown) and a subsequent contacting by means of metal spraying at the edges, which has become known as the Schoop method. For an improved insulation, a polyethylene layer 4, according to the present invention, has been applied on the mother capacitor 1, prior to separation thereof into individual capacitors by means of a saw 5. The saw 5 rotates in the direction of the arcuate arrow and causes the polyethylene material of the layer 1 to melt on contact; the saw 5 then distributes the polyethylene material over the cut area. The cut area is thereby almost completely sealed by the material distributed by the saw 5. A stream of air may be blown on the saw 5 to cool the saw during operation, as schematically indicated at 7 in FIG. 2.

In an optimum application of the method of the present invention, a capacitor is produced which is nearly completely sealed at the cut surfaces; i.e., under a microscope the cut surfaces appear free of tears or penetrating holes. Nevertheless, no interfering burr of 100 μm, for example, appears on the edges of the capacitor.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. In a method of producing layer cpacitors in which synthetic dielectric layers carrying metallic coatings are formed into a multilayer mother capacitor, in which individual capacitors are cut from the mother capacitor by sawing and the synthetic layers shrink at the cut edges due to the heat generated during sawing causing the metallic coatings adjacent the cut edges to break up into islands which oxidize to become insulating islands and in which the saw blade is lubricated during sawing, the improvement therein comprising the steps of:

applying a meltable polyolefin layer to the mother capacitor before sawing as a lubricating layer; advancing the saw blade relative the mother capacitor to first penetrate the polyolefin layer prior to penetration of the remainder of the mother capacitor;

melting the polyolefin material during sawing; and spreading the melted material along the surfaces produced by sawing to nearly completely seal those surfaces.

2. The improved method of claim 1, wherein the step of applying a polyolefin layer is further defined as applying a polyethylene layer to the mother capacitor.

3. The improved method of claim 1, wherein the step of applying a polyolefin layer is further defined as applying a polypropylene layer to the mother capacitor.

4. The improved method of claim 1, further defined by the steps of:

coating polyethylene terephthalate layers with aluminum to provide the metallic coated synthetic dielectric layers of the mother capacitor;

applying a polyethylene layer to the mother capacitor as the polyolefin lubricating layer; and sawing the lubricating layer-mother capacitor combination with a circular saw blade having a 100 mm diameter, a thickness of 0.5 mm, 160 teeth a rotational speed of 1500 RPM and an advancement speed of not greater than 50 mm/sec.

5. The improved method of claim 1, comprising the step of:

blowing cooling air on the saw blade during the sawing operation.

* * * * *